United States Patent [19]

Sargunar

[11] 3,938,757
[45] Feb. 17, 1976

[54] TAPE TRANSPORT SYSTEM INCLUDING A LOGICAL NETWORK FOR PRODUCING QUADRATURE PULSE TRAINS AND MOTOR CONTROL UTILIZING SAME

[75] Inventor: John E. Sargunar, Glenrothes, Scotland

[73] Assignee: Burroughs Corporation, Detroit, Mich.

[22] Filed: Mar. 29, 1974

[21] Appl. No.: 456,239

[30] Foreign Application Priority Data
May 2, 1973 United Kingdom............... 20840/73

[52] U.S. Cl....................................... 242/186; 318/6
[51] Int. Cl.² B65H 59/38; G03B 1/04; G11B 15/32
[58] Field of Search ........... 242/186, 188, 189, 190, 242/75.51, 75.5, 75.44; 318/6, 7

[56] References Cited
UNITED STATES PATENTS 3,297,266   1/1967   Rumple............................... 242/186
3,373,332   3/1968   Olsen............................ 242/75.51 X
3,764,087   10/1973   Paananen et al. .................. 242/191

Primary Examiner—Leonard D. Christian
Attorney, Agent, or Firm—Benjamin J. Barish; Edwin W. Uren; Kevin R. Peterson

[57] ABSTRACT

A constant speed reel-to-reel tape transport system is described including a drive motor having a pair of quadrature windings, and a motor supply producing a pair of square-wave motor-drive pulse trains of the same repetition rate, but 90° out of phase, one train being supplied to each of the quadrature windings. The system further includes control means responsive to the change in the effective radius of one of the reels, for example the drive reel, for varying the repetition rate of the pulse trains, and thereby the speed of the motor, to maintain a constant linear tape speed.

7 Claims, 3 Drawing Figures

3,938,757

TAPE TRANSPORT SYSTEM INCLUDING A LOGICAL NETWORK FOR PRODUCING QUADRATURE PULSE TRAINS AND MOTOR CONTROL UTILIZING SAME

BACKGROUND OF THE INVENTION

The present invention relates to tape transport systems such as are used in magnetic tape reel-to-reel drives. The invention also relates to logical networks for producing quadrature pulse trains, and to motor control systems utilizing such pulse trains, both of the foregoing being particularly useful in the novel tape transport system described herein.

Reel-to-reel tape transport systems commonly employ pinch rollers or capstans which engage and directly drive the tape. The linear velocity of the tape is thus directly determined by the angular velocity of the pinch roller or capstan, so that if a constant tape linear velocity is desired for example, this is easily accomplished by maintaining a constant angular velocity of the pinch roller or capstan. While the control of the drive is thus relatively simple, such systems are subject to a number of drawbacks. For example, the direct contact of the pinch rollers and capstans with the tape tends to deform the tape and to increase its wear and tear. Further, pinch rollers and capstans are susceptible to malfunction or failure. They also involve significant manufacturing and maintenance costs.

SUMMARY OF THE INVENTION

The present invention provides a tape transport system which does not require the use of pinch rollers or capstans for driving the tape, but which rather controls the angular velocity of the motor driving the drive reel, to move the tape at a constant linear velocity.

According to the invention, there is provided a constant speed reel-to-reel tape transport system comprising a drive motor including a pair of quadrature windings, and motor supply means producing a pair of square-wave motor-drive pulse trains of the same repetition rate, but 90° out of phase, each train being supplied to one of the quadrature windings of the drive motor to control its speed in accordance with the repetition rate of the pulse trains. The system further includes control means responsive to the change in the effective radius of one of the reels for varying the repetition rate of the pulse trains, and thereby the speed of the motor, to maintain a constant linear tape speed.

In the preferred embodiment of the invention described below, the control means is responsive to the change in the effective radius of the drive reel for varying the repetition rate of the pulse train in inverse proportion to the change in effective radius of the drive reel.

According to a further feature the control means comprises a digital counter counting the number of pulses supplied to the drive motor and producing thereby a digital count corresponding to the number of revolutions of the drive reel, a digital-to-analogue converter producing an analogue signal corresponding to said digital count, and means varying the repetition rate of the pulse train in inverse proportion to said analogue signal.

Further features and advantages of the invention will be apparent from the description below.

The foregoing features are particularly useful in a constant speed reel-to-reel tape transport system free of pinch rollers and capstans, in which the motor driving the drive reel is electronically controlled to maintain the constant speed. Accordingly, they are described below with respect to that application. It will be appreciated, however, that while the system for producing the quadrature pulse trains and the motor control utilizing such system, are both particularly useful in the foregoing system, they could also be used with advantage in other systems.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
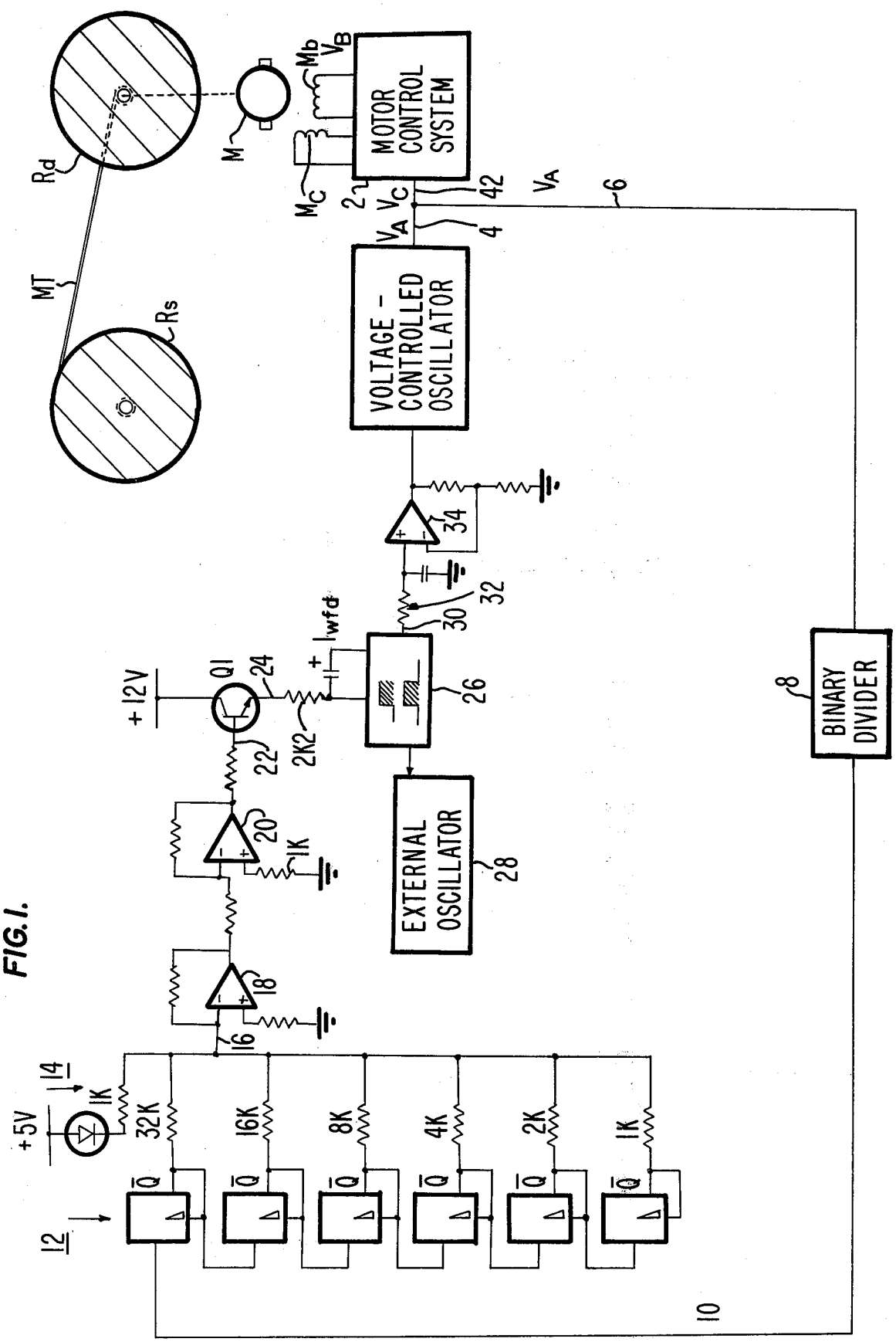
FIG. 1 is a functional block diagram illustrating a constant speed reel-to-reel tape transport system constructed in accordance with the invention.

The block diagram of FIG. 1 illustrates a reel-to-reel transport system comprising a supply reel Rs holding a supply of magnetic tape MT which is to be transferred to a drive reel Rd driven by an electric motor M.

Motor M illustrated in FIG. 1 is a hysteresis synchronous motor having a pair of quadrature windings Mb,Mc. Assuming no slip in the motor, its shaft speed, or angular velocity, will be directly proportional to the frequency of the power supplied to the motor. Thus, the shaft speed can be varied by varying this frequency.

The system is illustrated in FIG. 1 in its initial condition, wherein the supply reel Rs is fully loaded and the drive reel Rd is empty. It will be appreciated that as motor M drives the drive reel Rd, its effective radius will continuously increase with the buildup of magnetic tape. Accordingly, if the angular velocity of motor M is maintained constant during the tape transfer operation, the linear velocity of the tape MT will not remain constant but will continuously increase with the increase in the effective radius of the drive reel Rd.

According to an important aspect of the present invention, the angular velocity of motor M is continuously controlled in proportion to the change in the effective radius of one of the reels Rd, Rs, so as to maintain a substantially constant linear tape velocity. Briefly, this is accomplished by producing a train of motor-drive pulses which are supplied to motor M, and varying the repetition rate of the pulses in proportion to the change in the effective radius of one of the reels. Conceivably either reel could be used, but it has been found particularly advantageous to use the drive reel, in which case the pulse repetition rate is varied in inverse proportion to the change in its effective radius.

To provide the necessary rotating field in the motor, the current supplied to one quadrature winding must lead the other by 90°. Usually a capacitor is provided to generate this lead, but in that case the lead would vary with the input frequency.

According to another important aspect of the invention, this lead is generated digitally to ensure quadrature relationship between the two phases at all input frequencies.

Figure 2:
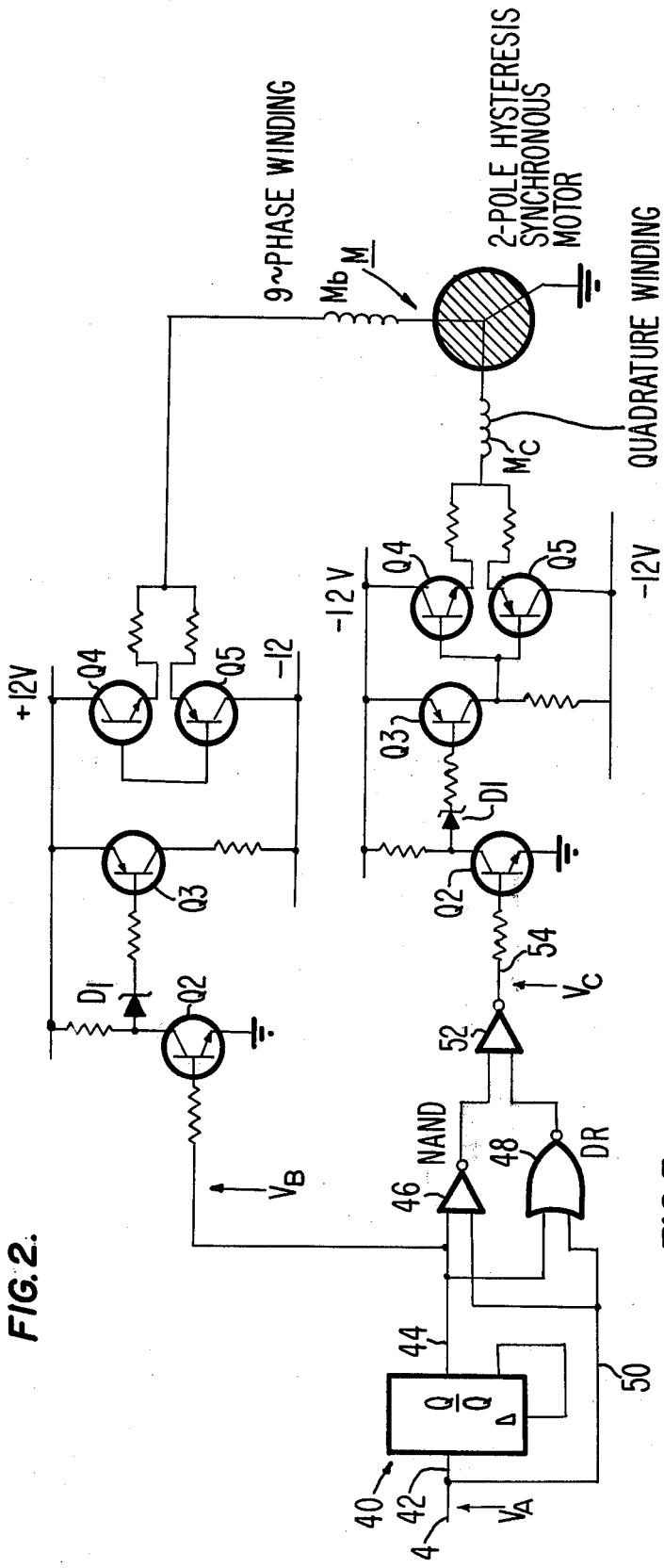
FIG. 2 illustrates a specific motor control circuit which may be used in the tape transport system of FIG. 1.

In FIG. 1, motor M is controlled by a motor control system generally designated by block 2, and more specifically illustrated in FIG. 2. The input to motor control system 2 is a train $V_A$ of square-wave pulses, the repetition rate and pulse width of which determine the speed of the motor. Motor control system 2 converts pulse train $V_A$ into two trains and supplies quadrature winding Mb with one train $V_B$ and the other quadrature winding Mc with the other train $V_C$. The latter train $V_C$ has the same pulse width and repetition rate as train $V_B$, but leads 90° in phase. This will be more fully described below with reference to the motor control system illustrated in FIG. 2.

In the described embodiment, the shaft of motor M is geared down 15:1 so that 15 revolutions of the motor will effect 1 revolution of the drive reel Rd. Thus, if the motor is supplied from a 50 Hz power supply, it will be rotated 3000 RPM and drive reel Rd will be rotated 200 RPM. In order to convert motor pulses $V_A$ supplied to the motor control system 2 to pulses corresponding to the revolutions of the supply reel Rd, the motor supply pulses $V_A$ are fed via line 6 to a divider circuit 8 which performs a binary division of the pulses to produce a quotient corresponding to the number of revolutions of the drive reel Rd. The quotient is then fed via line 10 to a binary up-counter generally designated 12 which counts the pulses. Since there is one of the latter pulses for each revolution of the drive reel Rd, the count within the counter at any one time is a binary number equal to the number of revolutions of the drive reel, starting from an initial condition, and therefore the number of turns of magnetic tape wound on the drive reel. Since each turn wound on the reel increases its effective radius by an amount equal to the thickness of the tape, the binary number in counter 12 is therefore also directly proportional to the effective radius of the drive reel.

The count in counter 12 is converted to an analogue signal by a digital-to-analogue circuit generally designated 14, the output of which appears on line 16 as an analogue signal directly varying with the increase in the effective radius of the drive reel.

The analogue signal on line 16 is amplified in a first inverting amplifier 18 and then in a second inverting amplifier 20 (e.g. each a 741C), the output of the latter being applied via line 22 to the base of a transistor emitter-follower Q1, the emitter of which is coupled by line 24 to a monostable oscillator 26 (e.g. 9601) driven by an external oscillator 28. The output of monostable oscillator 26 is thus a pulse train the period of which is inversely related to the increasing radius analogue signal fed thereto via line 24.

The output of oscillator 26 is integrated in circuit 32 to provide an analogue signal proportional to the average value of the pulse train from the oscillator, amplified by non-inverting amplifier 34, and is then applied to a voltage-controlled-oscillator 36 producing the motor drive pulses $V_A$ supplied to the motor control system 2.

Thus, as the effective radius of the drive reel Rd increases, the count within counter 12 likewise increases in direct proportion thereto, but the output signal of the monostable oscillator 26 varies in inverse proportion to this count. Therefore, the repetition rate of the motor drive pulse train $V_A$ supplied from the voltage-controlled oscillator 36 will also vary in inverse proportion to the increase in the drive reel radius, which will thereby vary the speed of motor M to maintain a substantially constant linear tape velocity.

FIG. 2 illustrates the details of motor control system 2 which receives the train $V_A$ of motor drive pulses and produces therefrom the two quadrature trains $V_B$, $V_C$ applied to the two motor quadrature windings Mb,Mc.

Figure 3:
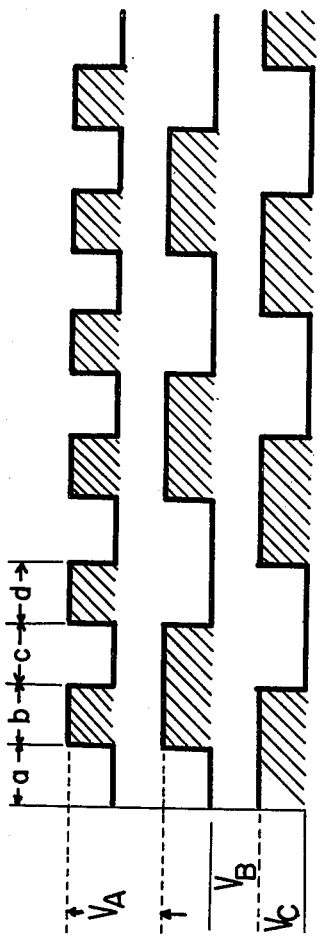
FIG. 3 illustrates waveforms helpful in understanding the operation of the circuit of FIG. 2.

FIG. 3 diagrammatically illustrates these three pulse trains and will be helpful in understanding how the two quadrature trains $V_B$ and $V_C$ are produced from the original train $V_A$.

The pulse train $V_A$ is applied to a triggering flip-flop 40 (e.g. SN 7474) having an input 42 connected to line 4 supplyng the $V_A$ pulse trains, the flip-flop being adapted to produce the pulse train $V_B$ in its Q output line 44. The circuit further includes a NAND-gate 46 and an OR-gate 48, each having a pair of inputs and one output. The pulses of train $V_A$ supplied via line 4 are fed via line 50 to one of the inputs of both of the above gates. The $V_B$ pulses appearing on flip-flop output line 44 are supplied to the other input of each of these gates.

The circuit further includes a second NAND-gate 52 having a pair of inputs, one connected to NAND-gate 46 and the other connected to OR-gate 48.

With the foregoing arrangement, NAND-gate 52 produces the second pulse train $V_C$ on its output line 54, as shown by the following explanation, having particularly reference to FIG. 3.

FIG. 3 illustrates the first pulse train $V_A$ with respect to time periods $a,b,c,d$, etc, as supplied to input line 42 of flip-flop 40.

In the first time period, $a$, it is assumed that no pulse appears in pulse train $V_A$. Output line 44 of the flip-flop will therefore be low, so that no pulse will be produced in train $V_B$. The output of NAND-gate 46 will be high, whereas the output of OR-gate 48 will be low, since both inputs are low; therefore output line 54 of NAND-gate 52 will be high, whereby a pulse will be produced in train $V_C$.

In time period $b$, a pulse appears in pulse train $V_A$ triggering flip-flop 40, and therefore the output line 44 will be high. Thus, a pulse will be produced in train $V_B$. Both inputs of NAND-gate 46 will be high, and therefore its output will be low; whereas both inputs of OR-gate 48 will be high and therefore its output will be high. Accordingly, the output of NAND-gate 52 will be high, and therefore the previous pulse in train $V_C$ will continue.

In time period $c$, no pulse appears in train $V_A$, but output line 44 of flip-flop 40 is still high, and therefore the pulse in train $V_B$ will continue through this time period $c$. Since only one input of NAND-gate 46 is high, its output line will be high; and since one input of OR-gate is high, its output line will also be high. Accordingly, the output of NAND-gate 52 will be low, this being shown by the termination of the pulse in train $V_C$.

In time period $d$, another pulse will appear in train $V_A$, triggering flip-flop 40 so that its output line 44 is low. Thus, there will be no pulse in train $V_B$. Since input line 44 of NAND-gate 46 is low, its output will be high, and since one input of OR-gate 48 is high, its output will likewise be high. Accordingly, the output of NAND-gate 52 will be low, this being shown in FIG. 3 by the absence of a pulse in train $V_C$.

It will thus be seen that pulse trains $V_B$ and $V_C$ will have the same repetition rate and pulse width, but will be 90° out of phase with each other. It will further be seen that the pulse rate of these two trains will be one-half that of train $V_A$, and the pulse width of the two trains will be double that of train $V_A$. Accordingly, in order to supply the pulses of the appropriate repetition rate and pulse width to the quadrature windings of the motor, to provide the desired speed of rotation, the pulses of train $V_A$ should have double the repetition rate and one-half the pulse width appropriate for driving the motor at the desired predetermined speed.

It will be seen that the two pulse trains $V_B$ and $V_C$ are always 90° out of phase with each other irrespective of the frequency or repetition rate, and therefore this phase-splitting circuit is not frequency-dependent. As indicated earlier, this is of distinct advantage over the previously known capacitor-type phase splitting circuit, which is frequency-dependent.

The foregoing circuit has a maximum output of about 10 milliamps. Accordingly, the two trains of pulses $V_B$ and $V_C$ are each fed to a power amplifier to generate load currents up to one amp, for supplying the respective quadrature windings Mb,Mc of the drive motor. Each of the power amplifiers illustrated in FIG. 2 comprises a grounded emitter transistor Q2 receiving the pulse train on its base, the collector of the transistor being connected via a Zener diode D1 to the base of a second transistor Q3. The collector of transistor Q3 is coupled to the commonly-connected bases of a pair of complementary transistors Q4,Q5, the emitters of which are connected to the respective quadrature windings of the motor, and the collectors of which are connected to the plus and minus power supply terminals, respectively.

Many modifications, variations and other applications of the invention will be apparent.

What is claimed is:

1. A constant speed reel-to-reel tape transport system, comprising: a tape drive reel; a tape supply reel; a drive motor driving the drive reel; said drive motor including a pair of quadrature windings; motor supply means producing a pair of square-wave motor-drive pulse trains of the same repetition rate, but 90° out of phase, and supplying one train to each of the quadrature windings of the drive motor to control its speed in accordance with the repetition rate of the pulse trains; and control means responsive to the change in the effective radius of one of said reels for varying the repetition rate of said pulse trains, and thereby the speed of the motor, to maintain a constant linear tape speed.

2. A system according to claim 1, wherein said control means is responsive to the change in the effective radius of the drive reel for varying the repetition rate of the pulse trains in inverse proportion to the change in effective radius of the drive reel.

3. A system according to claim 2, wherein said control means comprises a digital counter counting the number of pulses supplied to the drive motor and producing thereby a digital count corresponding to the number of revolutions of the drive reel, a digital-to-analogue converter producing an analogue signal corresponding to said digital count, and means varying the repetition rate of the pulse trains in inverse proportion to said analogue signal.

4. A system according to claim 3, wherein said last-named means comprises an external oscillator, a monostable oscillator driven thereby, means applying said analogue signal to said monostable oscillator to obtain an output therefrom inversely proportional to said digital count, a voltage-controlled-oscillator, and means controlling the frequency of said voltage controlled-oscillator in accordance with said last named signal.

5. A system according to claim 1, wherein said motor supply means comprises; means producing a first pulse train of a repetition rate and pulse width in accordance with the desired speed of the motor, and circuit means producing from said first pulse train said pair of motor-drive pulse trains each having one-half the repetition rate and double the pulse width of said first pulse train.

6. A system according to claim 5, wherein said circuit means comprise: a triggering flip-flop connected to receive at its input said first pulse train and to produce said second pulse train at one of its outputs; a first NAND-gate having a pair of inputs and an output; an OR-gate having a pair of inputs and an output; means supplying said first pulse train and said second pulse train to the pair of inputs of said first NAND-gate and to the pair of inputs of said OR-gate; a second NAND-gate having a pair of inputs and an output; and means supplying the outputs of said first NAND-gate and said OR-gate to the pair of inputs of said second NAND-gate to produce said third train of pulses at the output thereof.

7. A system according to claim 1, wherein said drive motor is a hysteresis synchronous motor.

* * * * *